(12) United States Patent
Yamashiro

(10) Patent No.: US 12,381,281 B2
(45) Date of Patent: Aug. 5, 2025

(54) POWER SUPPLY DEVICE, ELECTRIC VEHICLE AND POWER STORAGE DEVICE USING SAME, FASTENING MEMBER FOR POWER SUPPLY DEVICE, METHOD OF MANUFACTURING POWER SUPPLY DEVICE, AND METHOD OF MANUFACTURING FASTENING MEMBER FOR POWER SUPPLY DEVICE

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 637 days.

(21) Appl. No.: 17/441,332

(22) PCT Filed: Dec. 24, 2019

(86) PCT No.: PCT/JP2019/050464
§ 371 (c)(1),
(2) Date: Sep. 21, 2021

(87) PCT Pub. No.: WO2020/202671
PCT Pub. Date: Oct. 8, 2020

(65) Prior Publication Data
US 2022/0190422 A1 Jun. 16, 2022

(30) Foreign Application Priority Data
Mar. 29, 2019 (JP) .................. 2019-066830

(51) Int. Cl.
*H01M 50/249* (2021.01)
*H01M 50/209* (2021.01)
(Continued)

(52) U.S. Cl.
CPC ....... *H01M 50/249* (2021.01); *H01M 50/209* (2021.01); *H01M 50/224* (2021.01); *H01M 50/262* (2021.01); *H01M 2220/20* (2013.01)

(58) Field of Classification Search
CPC ............. H01M 50/249; H01M 50/262; H01M 50/209; H01M 50/224
See application file for complete search history.

(56) References Cited

U.S. PATENT DOCUMENTS

| 5,766,801 A | 6/1998 | Inoue et al. |
| 2013/0183571 A1 | 7/2013 | Miyazaki et al. |

(Continued)

FOREIGN PATENT DOCUMENTS

| EP | 3806182 A1 | 4/2021 |
| JP | 9-120808 | 5/1997 |

(Continued)

OTHER PUBLICATIONS

Extended (Supplementary) European Search Report dated Apr. 22, 2022, issued in counterpart EP Application No. 19923444.4. (7 pages).

(Continued)

*Primary Examiner* — Kenneth J Douyette
(74) *Attorney, Agent, or Firm* — WHDA, LLP

(57) ABSTRACT

The power supply device includes: a plurality of secondary battery cells each including a prismatic exterior can; a pair of end plates covering both end surfaces of a battery stack body in which the plurality of secondary battery cells are stacked; and a plurality of fastening members made of metal each having a plate shape extending in a stack direction of the plurality of secondary battery cells and disposed on an opposing side surface of the battery stack body to fasten the end plates to each other, in which each of the plurality of fastening members includes fastening part fixed to the end (Continued)

plate at each of both ends in a longer direction, and intermediate part coupling fastening parts with each other, and fastening parts is higher in strength than intermediate part, and intermediate part is higher in stretchability than fastening parts.

8 Claims, 13 Drawing Sheets

(51) Int. Cl.
*H01M 50/224* (2021.01)
*H01M 50/262* (2021.01)

(56) References Cited

U.S. PATENT DOCUMENTS

2016/0301051 A1* 10/2016 Kubota ................. B60L 50/64
2020/0099027 A1    3/2020 Ishibashi et al.

FOREIGN PATENT DOCUMENTS

| JP | 2016-033909 | 3/2016 |
| WO | 2012/043594 | 4/2012 |
| WO | 2014/024431 | 2/2014 |
| WO | 2018/235556 A1 | 12/2018 |

OTHER PUBLICATIONS

International Search Report of PCT application No. PCT/JP2019/050464 dated Mar. 24, 2020.

* cited by examiner

POWER SUPPLY DEVICE, ELECTRIC VEHICLE AND POWER STORAGE DEVICE USING SAME, FASTENING MEMBER FOR POWER SUPPLY DEVICE, METHOD OF MANUFACTURING POWER SUPPLY DEVICE, AND METHOD OF MANUFACTURING FASTENING MEMBER FOR POWER SUPPLY DEVICE

CROSS-REFERENCE TO RELATED APPLICATIONS

This application is a U.S. national stage application of the PCT International Application No. PCT/JP2019/050464 filed on Dec. 24, 2019, which claims the benefit of foreign priority of Japanese patent application No. 2019-066830 filed on Mar. 29, 2019, the contents all of which are incorporated herein by reference.

TECHNICAL FIELD

The present invention relates to a power supply device and an electric vehicle and a power storage device using the same, a fastening member for a power supply device, a manufacturing method for a power supply device, and a manufacturing method for a fastening member for a power supply device.

BACKGROUND ART

The power supply device is used as a power supply device for driving an electric vehicle, a power supply device for power storage, and the like. In such a power supply device, a plurality of chargeable and dischargeable secondary battery cells are stacked. In general, as shown in a perspective view of FIG. 8, in power supply device 900, end plates 903 are disposed on both end surfaces of a battery stack body in which secondary battery cells 901 having prismatic exterior cans are stacked, and end plates 903 are fastened to each other with binding bar 904 made of metal.

When the secondary battery cell is repeatedly charged and discharged, the exterior can expands and contracts. In particular, with the recent demand for high capacity, the capacity per secondary battery cell has been increasing, and as a result, the expansion amount tends to increase. In the battery stack body in which a large number of such secondary battery cells are stacked and fastened, a strong load is applied at the time of expansion. As a result, it is conceivable that a strong shear stress acts on the joint portion between the binding bar and the end plate to cause breakage. Therefore, it is required to enhance the strength of the binding bar.

However, in general, when the strength of the metal material is increased, the stretchability deteriorates. When the secondary battery cell expands, a load is applied in a direction where the binding bar extends, but there is a contradictory problem that resistance to expansion conversely decreases when stretchability decreases.

CITATION LIST

Patent Literature

PTL 1: Unexamined Japanese Patent Publication No. H9-120808

SUMMARY OF THE INVENTION

An object of the present invention is to provide a power supply device in which stretchability is secured while strength is enhanced in fastening of a battery stack body where a plurality of secondary battery cells are stacked, and an electric vehicle and a power storage device using the same, a fastening member for a power supply device, a manufacturing method for a power supply device, and a manufacturing method for a fastening member for a power supply device.

A power supply device according to an aspect of the present invention is a power supply device including: a plurality of secondary battery cells with a prismatic exterior can; a pair of end plates covering both end surfaces of a battery stack body in which the plurality of secondary battery cells are stacked; and a plurality of fastening members made of metal each having a plate shape extending in a stack direction of the plurality of secondary battery cells and disposed on an opposing side surface of the battery stack body to fasten the end plates to each other, in which each of the plurality of fastening members includes a fastening part fixed to the end plate at each of both ends in a longer direction, and an intermediate part coupling the fastening parts with each other, and the fastening part is higher in strength than the intermediate part, and the intermediate part is higher in stretchability than the fastening part.

An electric vehicle according to an aspect of the present invention includes the power supply device, a traveling motor to which electric power is supplied from the power supply device, a vehicle body on which the power supply device and the motor are mounted, and wheels driven by the motor to cause the vehicle body to travel.

A power storage device according to an aspect of the present invention includes: the power supply device; and a power supply controller that controls charging and discharging of the power supply device, and the power supply controller enables charging of the secondary battery cell by external electric power and controls the secondary battery cell so as to charge.

A fastening member for a power supply device according to an aspect of the present invention is a fastening member for a power supply device for fastening a pair of end plates covering both end surfaces of a battery stack body in which a plurality of secondary battery cells each including a prismatic exterior can are stacked, the fastening member including: a fastening part fixed to the end plate at each of both ends in a longer direction; and an intermediate part including a second metal, the intermediate part coupling the fastening parts with each other, in which the fastening part is higher in strength than the intermediate part, and the intermediate part is higher in stretchability than the fastening part.

A manufacturing method for a fastening member according to an aspect of the present invention is a manufacturing method for a fastening member for a power supply device for fastening a pair of end plates covering both end surfaces of a battery stack body in which a plurality of secondary battery cells each including a prismatic exterior can are stacked, the manufacturing method including: a step of preparing a fastening part fixed to the end plate at each of both ends in a longer direction and an intermediate part coupling the fastening parts with each other; and a step of welding the fastening part and an intermediate part.

A manufacturing method for a power supply device according to an aspect of the present invention is a manufacturing method for a power supply device, the power supply device including a plurality of secondary battery cells each including a prismatic exterior can, a pair of end plates covering both end surfaces of a battery stack body in which the plurality of secondary battery cells are stacked, and a plurality of fastening members made of metal each having a plate shape extending in a stack direction of the plurality of secondary battery cells and disposed on an opposing side surface of the battery stack body to fasten the end plates to each other, the manufacturing method including: a step of joining a fastening part fixed to the end plate at each of both ends in a longer direction and an intermediate part coupling the fastening parts with each other; and a step of covering both end surfaces of the battery stack body with a pair of end plates and fastening the end plates to each other with a fastening member for a power supply device.

According to the power supply device described above, the strength of the fastening part of the fastening member for fastening the battery stack body is increased, whereby the resistance to expansion of the secondary battery cell is increased, and the stretchability of the intermediate part is increased, so that it is possible to achieve both contradictory characteristics of strength and stretchability at the same time.

DESCRIPTION OF EMBODIMENTS

Figure 1:
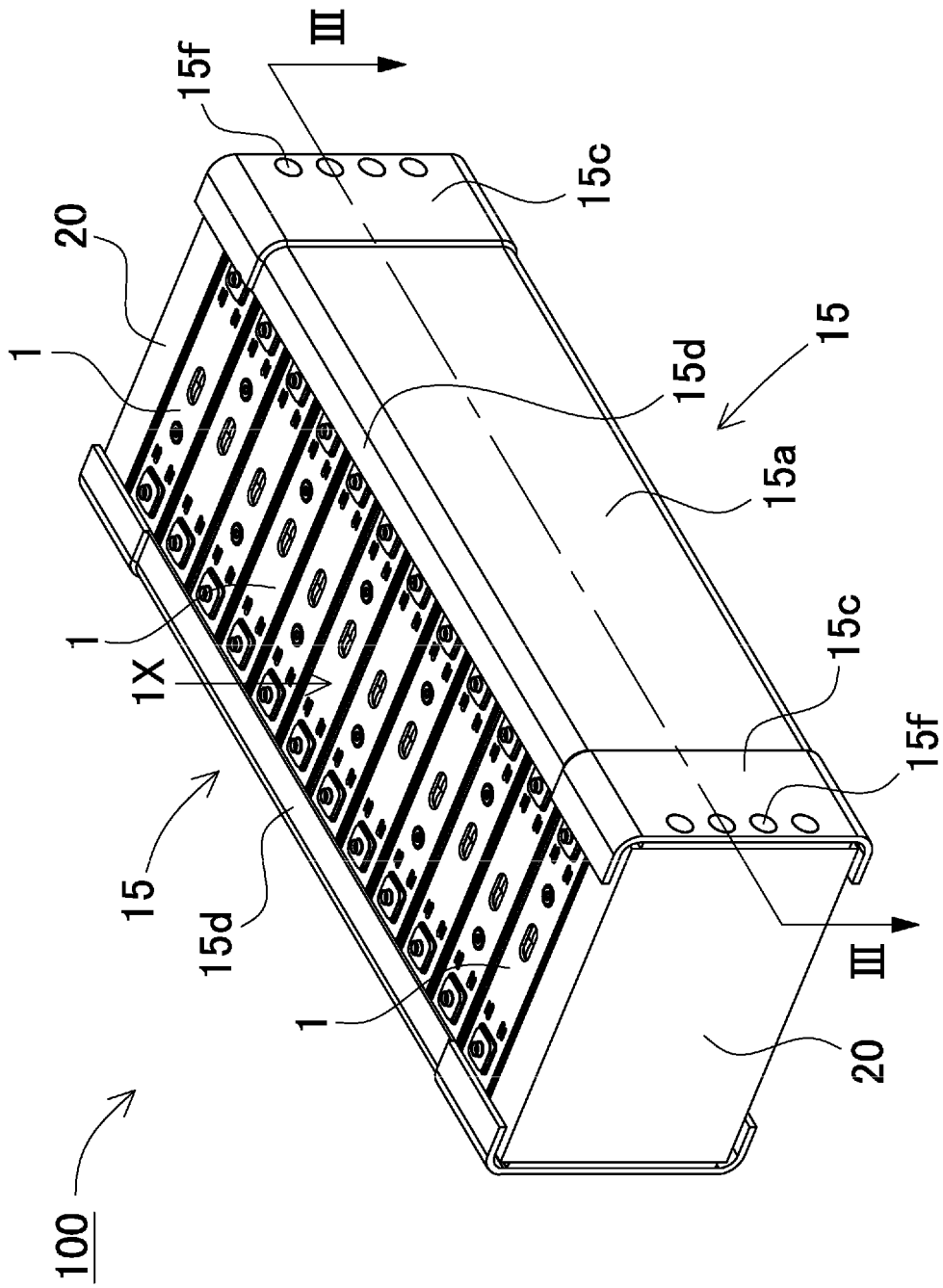
FIG. 1 is a perspective view showing a power supply device according to a first exemplary embodiment.

A power supply device according to an aspect of the present invention may be configured as follows in addition to the above-described configuration. In a power supply device according to one exemplary embodiment of the present invention, the fastening part is formed to be thicker than the intermediate part. With the above configuration, the strength and stretchability can each be adjusted by varying the thickness of the fastening member made of metal.

Furthermore, in a power supply device according to another exemplary embodiment of the present invention, the fastening member further includes a locking block fixed to the fastening part, the end plate forms a step part for locking the locking block in a state of being fastened by the fastening member, and the fastening part and the locking block are fixed by welding. With the above configuration, it is possible to achieve both strength and stretchability by causing sufficient welding strength to be exhibited by performing welding at the thickened fastening part, meanwhile ensuring stretchability at the thinned intermediate part to respond deformation to expansion of the secondary battery cell.

Furthermore, in a power supply device according to another exemplary embodiment of the present invention, the fastening part includes a first metal, the intermediate part includes a second metal different from the first metal, the first metal is higher in strength than the second metal, and the second metal is higher in stretchability than the first metal. With the above configuration, it is possible to constitute a region in which strength and stretchability are each enhanced by a combination of dissimilar metals.

Furthermore, in a power supply device according to another exemplary embodiment of the present invention, surfaces covering side surfaces of the battery stack body of each of the plurality of fastening members are formed in the same plane in joint between the fastening part and an intermediate part.

Furthermore, in a power supply device according to another exemplary embodiment of the present invention, the fastening member includes a differential thickness material. With the above configuration, the fastening part and the intermediate part can be configured with separate members.

Furthermore, in a power supply device according to another exemplary embodiment of the present invention, a joint interface between the fastening part and the intermediate part of the fastening member is joined by welding. With the above configuration, it is possible to join metals to each other with higher reliability than that of spot welding or the like.

Exemplary embodiments of the present invention will be described below with reference to the drawings. However, the exemplary embodiments described below are examples for embodying the technical idea of the present invention, and the present invention is not limited to the following. In addition, the present description does not specify the members shown in the claims to the members of the exemplary embodiments in any way. In particular, unless otherwise specified, dimensions, materials, shapes, relative arrangements, and the like of the components described in the exemplary embodiments are not intended to limit the scope of the present invention thereto, but are merely illustrative examples. Note that sizes, positional relationships, and the like of members illustrated in the drawings may be exaggerated for clarity of description. Furthermore, in the following description, the identical names and reference numerals indicate the identical members or members of the same nature, and detailed description thereof will be omitted as appropriate. Furthermore, each element constituting the present invention may be achieved in an aspect in which a plurality of elements include the identical member and one member serves as the plurality of elements, or conversely, can be achieved with a function of one member being shared by a plurality of members. In addition, some contents described in some examples and exemplary embodiments can be used in another example, exemplary embodiment, and the like.

The power supply device according to the exemplary embodiment is used for various applications such as a power supply that is mounted on an electric vehicle such as a hybrid vehicle or an electric vehicle and supplies electric power to a traveling motor, a power supply that stores generated power of natural energy such as solar power generation and wind power generation, and a power supply that stores midnight electric power. The power supply device according to the exemplary embodiment is used as a power supply suitable for high-power, high-current applications in particular. In the following example, an exemplary embodiment will be described in which the power supply device according to the exemplary embodiment is applied to a power supply device for driving an electric vehicle.

First Exemplary Embodiment

Figure 2:
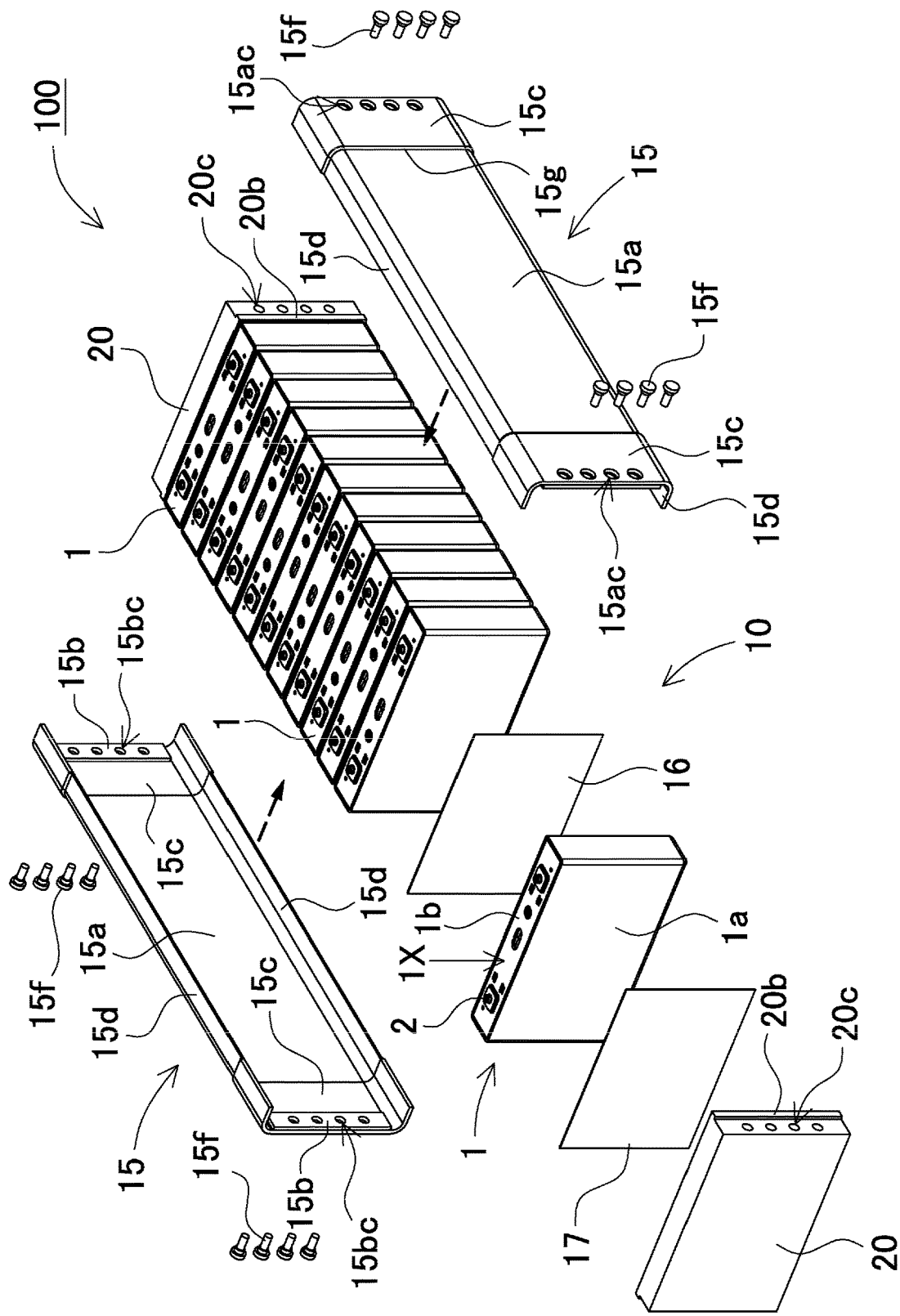
FIG. 2 is an exploded perspective view of the power supply device of FIG. 1.
Figure 3:
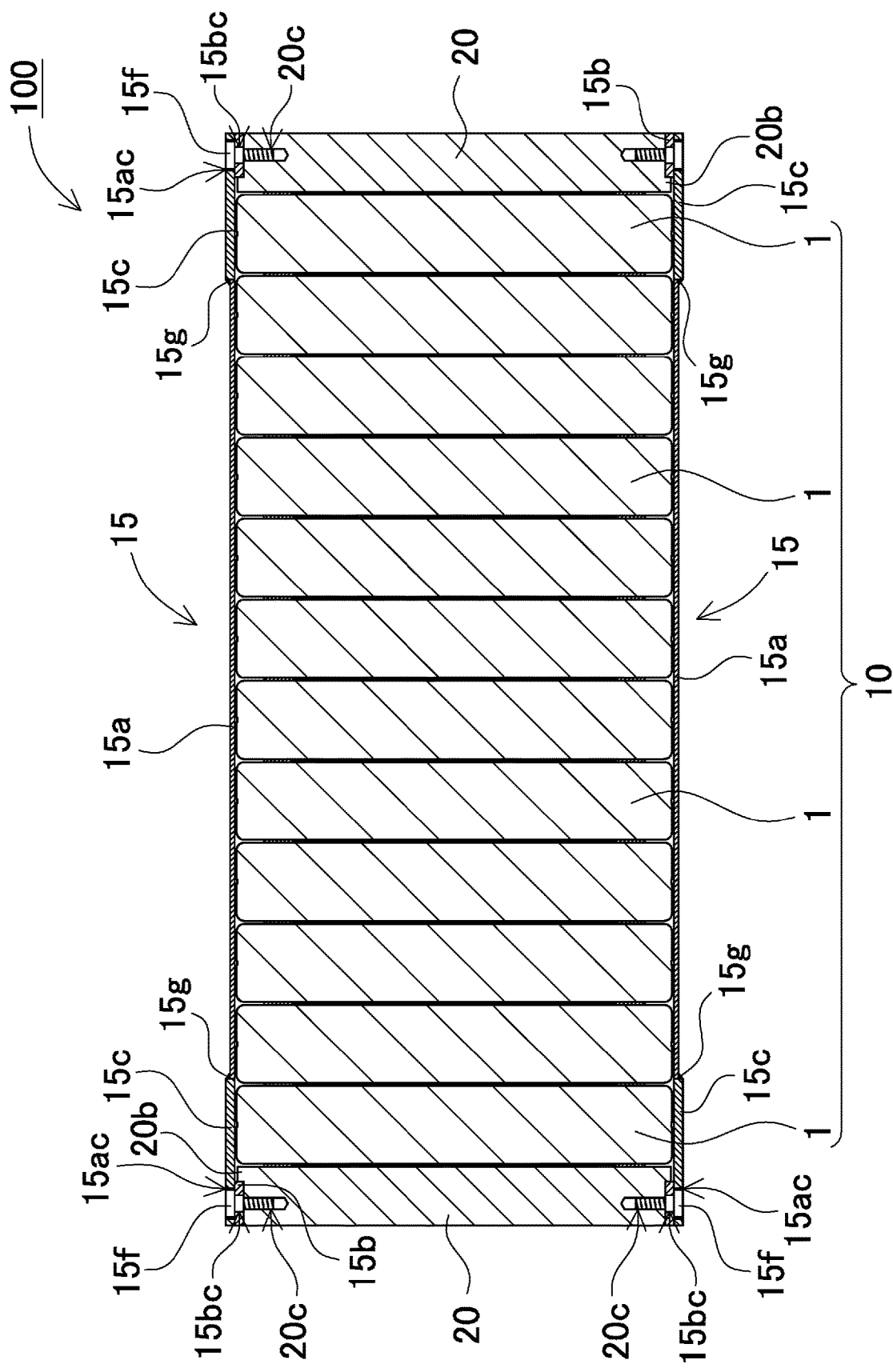
FIG. 3 is a horizontal cross-sectional view taken along line III-III of the power supply device of FIG. 1.
Figure 4:
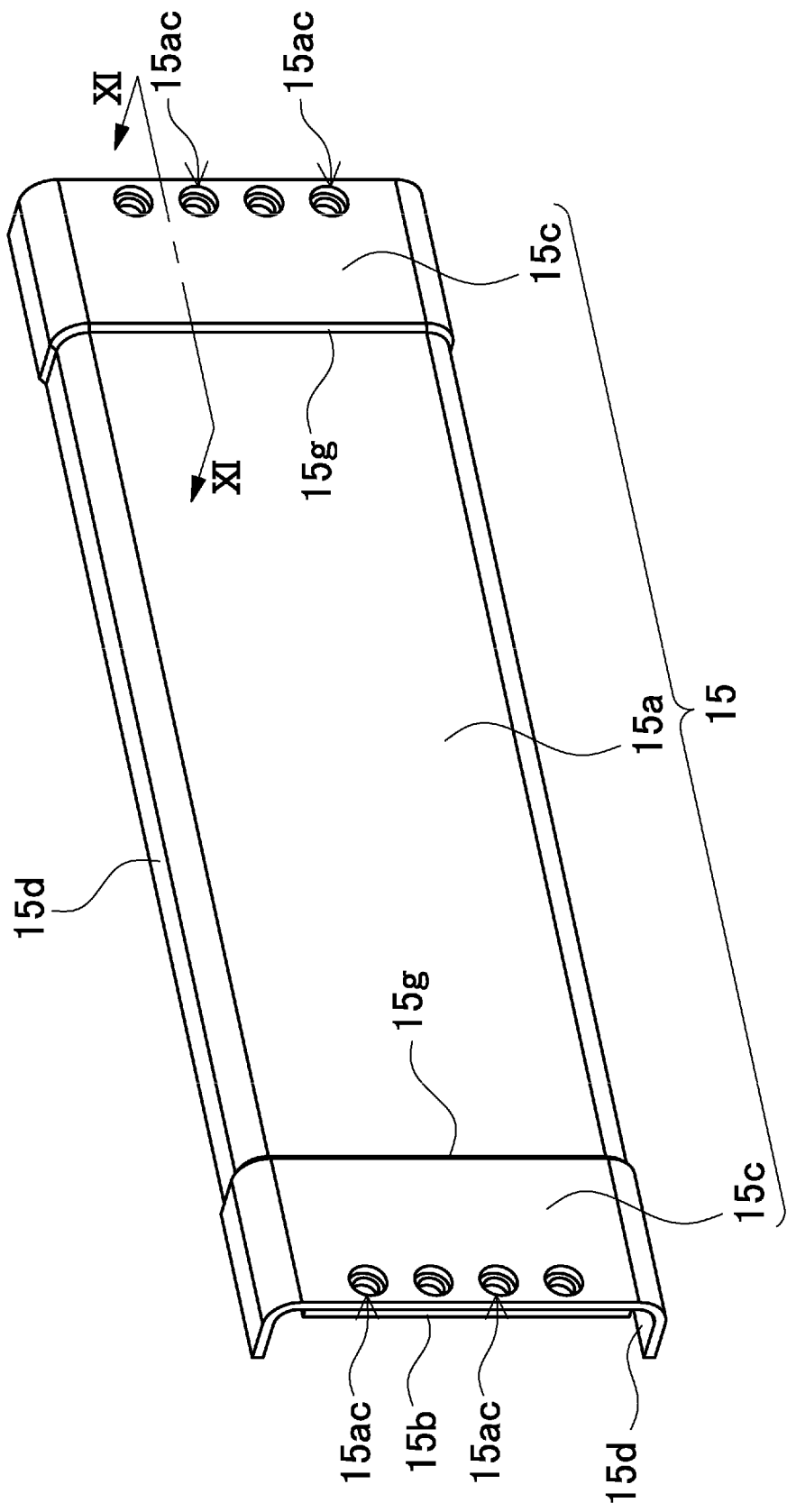
FIG. 4 is a perspective view showing a fastening member of FIG. 2.
Figure 5:
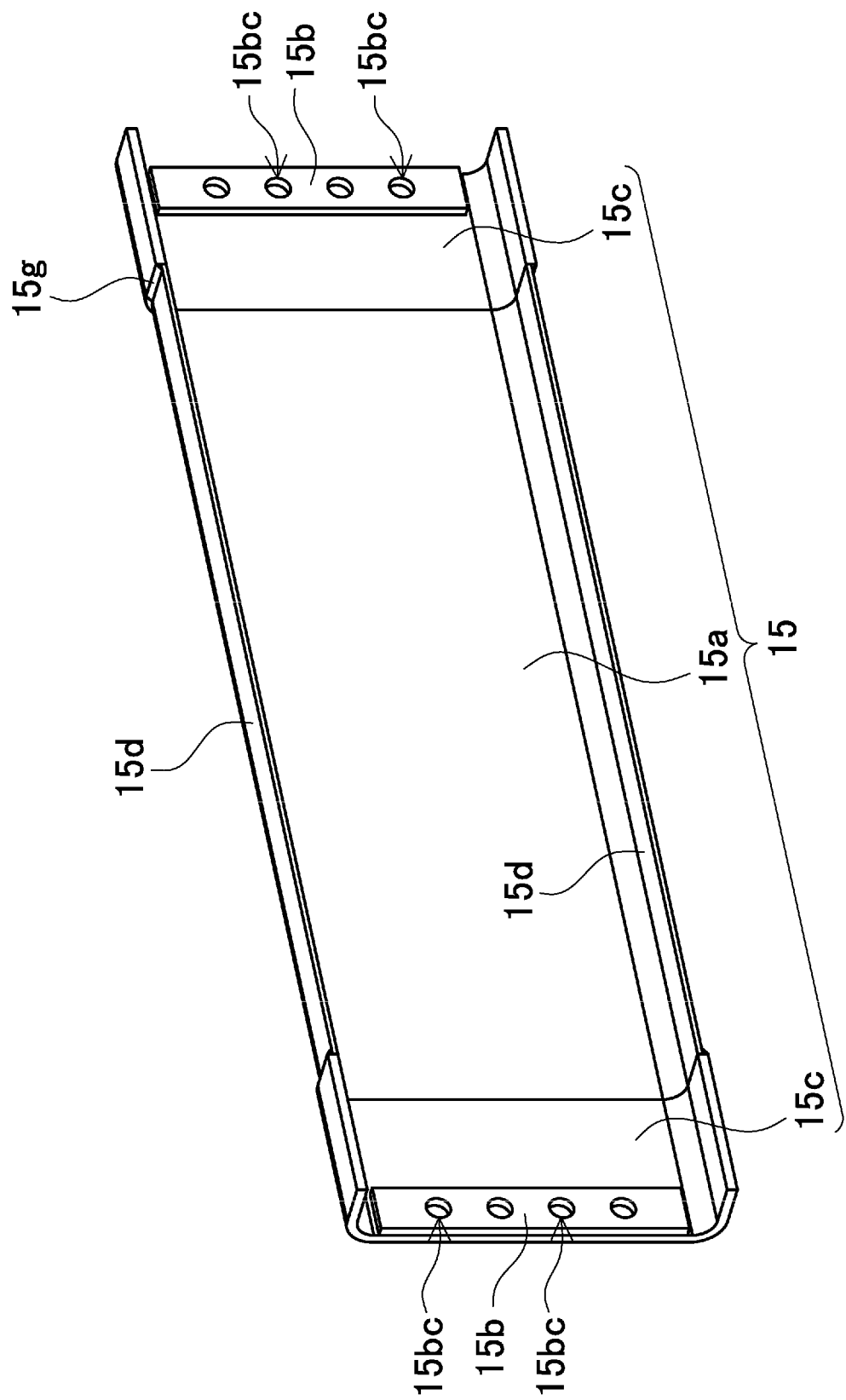
FIG. 5 is a perspective view of the fastening member of FIG. 4 as viewed from a rear surface.
Figure 6:
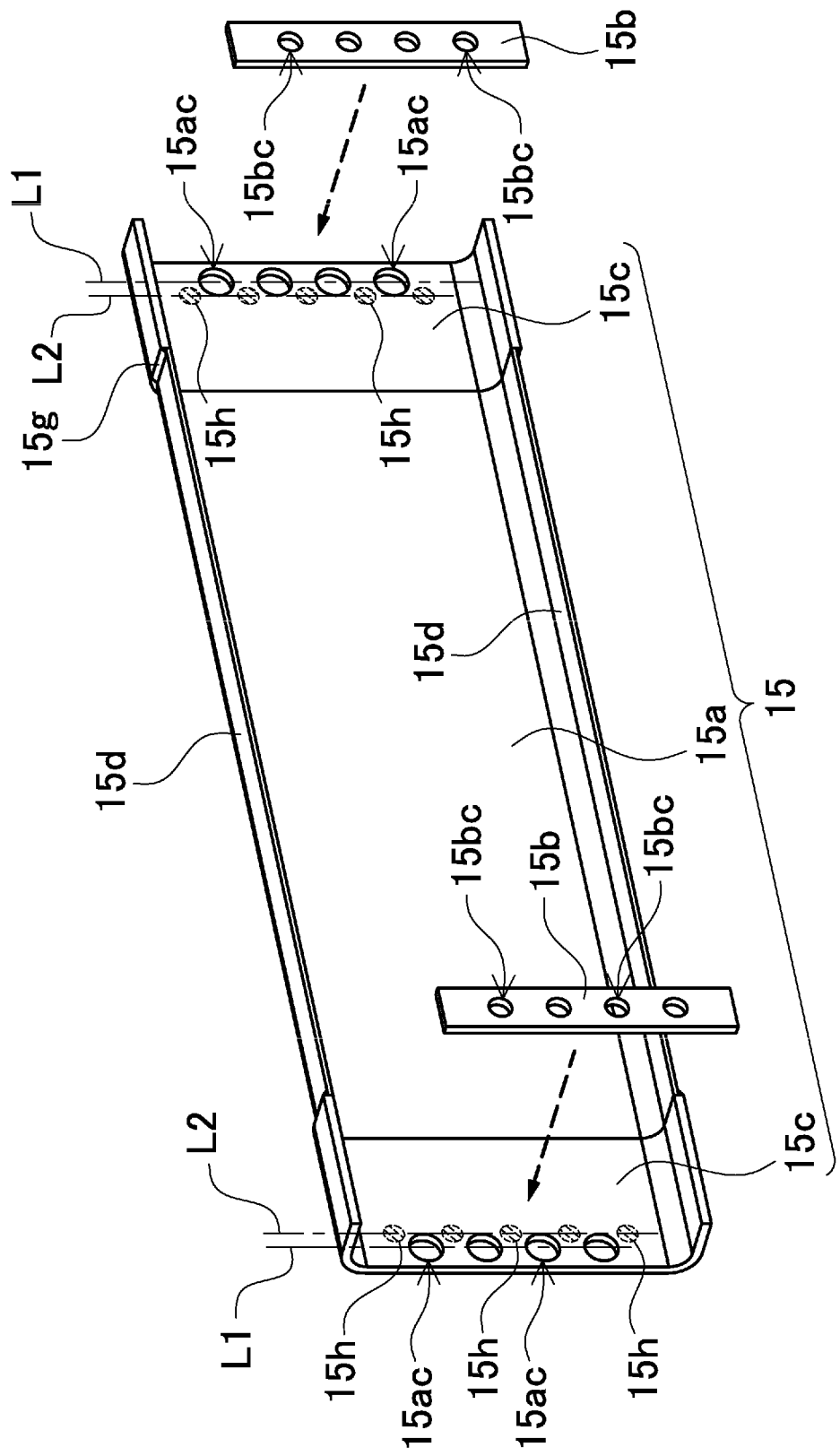
FIG. 6 is an exploded perspective view of the fastening member of FIG. 5.

FIG. 1 shows a perspective view of power supply device 100 according to a first exemplary embodiment of the present invention, FIG. 2 shows an exploded perspective view of power supply device 100, FIG. 3 shows a horizontal cross-sectional view of power supply device 100 of FIG. 1 taken along line III-III, FIG. 4 shows a perspective view showing fastening member 15 of FIG. 2, FIG. 5 shows a perspective view of fastening member 15 of FIG. 4 viewed from the rear surface, and FIG. 6 shows an exploded perspective view of fastening member 15 of FIG. 5. Power supply device 100 shown in these figures includes battery stack body 10 in which a plurality of secondary battery cells 1 are stacked, a pair of end plates 20 covering both end surfaces of battery stack body 10, and a plurality of fastening members 15 fastening end plates 20 to each other.

Battery stack body 10 includes a plurality of secondary battery cells 1 including positive and negative electrode terminals 2, and a bus bar (not illustrated) connected to electrode terminals 2 of the plurality of secondary battery cells 1 and connecting the plurality of secondary battery cells 1 in parallel and in series. The plurality of secondary battery cells 1 are connected in parallel and in series via these bus bars. Secondary battery cell 1 is a chargeable and dischargeable secondary battery. In power supply device 100, the plurality of secondary battery cells 1 are connected in parallel to constitute a parallel battery group, and a plurality of parallel battery groups are connected in series, so that a large number of secondary battery cells 1 are connected in parallel and in series. In power supply device 100 shown in FIGS. 1 to 3, the plurality of secondary battery cells 1 are stacked to form battery stack body 10. The pair of end plates 20 are disposed on both end surfaces of battery stack body 10. End parts of fastening members 15 are fixed to end plates 20, and secondary battery cells 1 in the stacked state are fixed into a pressurized state.

(Secondary Battery Cell 1)

Secondary battery cell 1 is a prismatic battery with a quadrangular outer shape of the main surface, which is a wide surface, and has a thickness smaller than the width. Furthermore, secondary battery cell 1 is a secondary battery that can be charged and discharged, and is a lithium ion secondary battery. However, the present invention does not specify the secondary battery cell to a prismatic battery, and also does not specify the secondary battery cell to a lithium ion secondary battery. As the secondary battery cell, it is also possible to use any chargeable battery such as a non-aqueous electrolyte secondary battery and a nickel-metal hydride secondary battery cell other than the lithium ion secondary battery.

As shown in FIG. 2, in secondary battery cell 1, an electrode body in which positive and negative electrode plates are stacked is housed in exterior can 1a, and filled with an electrolytic solution to airtightly seal exterior can 1a. Exterior can 1a is molded into a bottomed rectangular tubular shape, and an upper opening is airtightly closed with sealing plate 1b of a metal plate. Exterior can 1a is manufactured by deep-drawing a metal plate such as aluminum or an aluminum alloy. Sealing plate 1b is made of a metal plate such as aluminum or an aluminum alloy in the same manner as exterior can 1a. Sealing plate 1b is inserted into an opening of exterior can 1a. A boundary between an outer periphery of sealing plate 1b and an inner periphery of exterior can 1a is irradiated with laser light, and sealing plate 1b is airtightly fixed to exterior can 1a by laser welding.

(Electrode Terminal 2)

In secondary battery cell 1, positive and negative electrode terminals 2 are fixed to both ends of terminal surface 1X with sealing plate 1b, which is a top surface, being used as terminal surface 1X. A projection part of electrode terminal 2 has a columnar shape. However, the projection part is not necessarily a column, and may be a polygonal prism or an elliptic column.

The positions of positive and negative electrode terminals 2 to be fixed to sealing plate 1b of secondary battery cell 1 are the positions where the positive electrode and the negative electrode become bilaterally symmetrical. Thus, secondary battery cells 1 are laterally inverted and stacked, and electrode terminals 2 of the positive electrode and the negative electrode that are adjacent and close to each other are connected by a bus bar, so that adjacent secondary battery cells 1 can be connected in series.

(Battery Stack Body 10)

The plurality of secondary battery cells 1 are stacked such that the thickness direction of each secondary battery cell 1 is the stack direction to constitute battery stack body 10. In battery stack body 10, the plurality of secondary battery cells 1 are stacked such that terminal surface 1X on which positive and negative electrode terminals 2 are provided, and sealing plate 1b in FIG. 2 are on the same plane.

In battery stack body 10, insulating spacer 16 may be interposed between secondary battery cells 1 stacked adjacent to each other. Insulating spacer 16 is an insulating material made of resin or the like manufactured in a thin plate shape or a sheet shape. Insulating spacer 16 has a plate shape having substantially the same size as the opposing surface of secondary battery cell 1. Insulating spacer 16 is stacked between secondary battery cells 1 adjacent to each other, whereby adjacent secondary battery cells 1 can be insulated from each other. As the spacer disposed between adjacent secondary battery cells 1, it is also possible to use a spacer having a shape in which a flow path of a cooling gas is formed between secondary battery cells 1 and the spacer. In addition, the surface of secondary battery cell 1 can be covered with an insulating material. For example, the surface of the exterior can excluding the electrode portion of the secondary battery cell may be thermally welded with a shrink tube such as a polyethylene terephthalate (PET) resin. In this case, the insulating spacer may be omitted. Furthermore, in a power supply device in which a plurality of secondary battery cells are connected in massively parallel and massively series, insulating spacers are interposed between the secondary battery cells connected in series to insulate therebetween. On the other hand, in between the secondary battery cells connected in parallel, a voltage difference does not occur between adjacent exterior cans, and thus the insulating spacer between these secondary battery cells can be omitted.

Furthermore, in power supply device 100 shown in FIG. 2, end plates 20 are disposed on both end surfaces of battery stack body 10. End surface spacer 17 may be interposed between end plate 20 and battery stack body 10 to insulate end plate 20 and battery stack body 10 from each other. End surface spacer 17 can also be an insulating material made of resin or the like manufactured in a thin plate shape or a sheet shape.

In battery stack body 10, a metal bus bar is connected to positive and negative electrode terminals 2 of adjacent secondary battery cells 1, and the plurality of secondary battery cells 1 are connected in parallel and in series via this bus bar. In battery stack body 10, for a plurality of secondary battery cells 1 connected in parallel to each other to constitute a parallel battery group, the plurality of secondary battery cells 1 are stacked such that positive and negative electrode terminals 2 provided at both end parts of terminal surface 1X are in the same right and left orientation, and for secondary battery cells 1 constituting a parallel battery group connected in series to each other, the plurality of secondary battery cells 1 are stacked such that positive and negative electrode terminals 2 provided at both end parts of terminal surface 1X are in opposite right and left orientations. However, the present invention does not specify a number of secondary battery cells constituting the battery stack body and the connection state thereof. The number of secondary battery cells constituting the battery stack body and the connection state thereof can be variously changed including other exemplary embodiments to be described later.

In power supply device 100 according to the exemplary embodiment, in battery stack body 10 in which the plurality of secondary battery cells 1 are stacked on each other, electrode terminals 2 of the plurality of secondary battery cells 1 adjacent to each other are connected by a bus bar, and the plurality of secondary battery cells 1 are connected in parallel and in series. A bus bar holder may be disposed between battery stack body 10 and the bus bar. By using the bus bar holder, a plurality of bus bars can be disposed at fixed positions on the upper surface of the battery stack body while insulating the plurality of bus bars from each other and insulating the terminal surfaces of the secondary battery cells and the bus bars.

(Bus Bar)

A metal plate is cut and processed, and thus the bus bar is manufactured into a predetermined shape. As the metal plate constituting the bus bar, a metal having low electric resistance and light weight, for example, an aluminum plate, a copper plate, or an alloy thereof can be used. However, as the metal plate of the bus bar, other metals having small electric resistance and light weight or alloys thereof can also be used.

(End Plate 20)

As shown in FIGS. 1 to 3, end plates 20 are disposed to both ends of battery stack body 10 and fastened via a pair of right and left fastening members 15 disposed along both side surfaces of battery stack body 10. End plates 20 are disposed at both ends of battery stack body 10 in the stack direction of secondary battery cells 1 and outside end surface spacer 17 to sandwich battery stack body 10 from both ends.

(Step Part 20b)

End plate 20 forms step part 20b for locking block 15b provided on fastening member 15 in a state of being fastened by fastening member 15. Step part 20b is formed in a size and a shape enough to be able to lock locking block 15b of fastening member 15 described later. In the example of FIG. 2, flange-shaped step part 20b is formed such that end plate 20 has a T-shape in a horizontal cross-sectional view. End plate screw hole 20c is opened near step part 20b.

(Fastening Member 15)

Both ends of fastening member 15 are fixed to end plates 20 disposed on both end surfaces of battery stack body 10. End plates 20 are fixed by the plurality of fastening members 15, thereby fastening battery stack body 10 in the stack direction. As shown in FIGS. 4 to 6 and the like, each fastening member 15 is a metal plate having a predetermined width and a predetermined thickness along the side surface of battery stack body 10, and is disposed to face both side surfaces of battery stack body 10.

Fastening member 15 includes fastening parts 15c fixed to end plates 20 at both ends in the longer direction and intermediate part 15a coupling fastening parts 15c with each other. Here, fastening part 15c is made higher in strength than intermediate part 15a, and intermediate part 15a is made higher in stretchability than fastening part 15c. Due to this, while fastening part 15c enhances the strength and exerts the fastening force of the battery stack body, intermediate part 15a enhances the stretchability, so as to easily deform at the time of expansion of secondary battery cell 1, and thus contradictory characteristics of strength and stretchability are achieved at the same time.

(Differential Thickness Material)

In fastening member 15, fastening part 15c and intermediate part 15a are preferably made of a differential thickness material. The differential thickness material is a material having a shape partially different in thickness of material. Specifically, a plurality of steel plates (blanks) different in thicknesses are joined. As a joint method, various methods such as welding such as laser welding and metal inert gas (MIG) welding, friction pressure welding, electromagnetic welding, welding of b, and brazing such as laser brazing and MIG brazing can be adopted. The differential thickness material can also be formed by partially rolling or sequentially forging a single steel plate (blank). This allows fastening part 15c and intermediate part 15a to include separate members. A member having high strength is allocated to fastening part 15c and a member having high stretchability is allocated to intermediate part 15a. Thus, fastening member 15 having both strength and stretchability, which have been conventionally difficult to achieve at the same time, is obtained. Hereinafter, a configuration in which fastening member 15 is formed by laser welding of a plurality of steel plates (blanks) having different plate thicknesses will be described as an example.

Figure 7A:
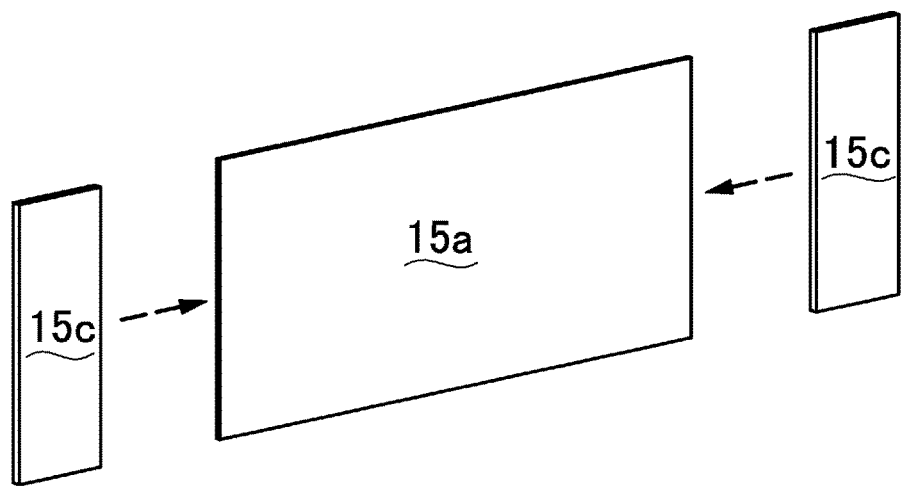
FIG. 7 is a schematic view showing a procedure of configuring a fastening member with a differential thickness material.
Figure 7B:
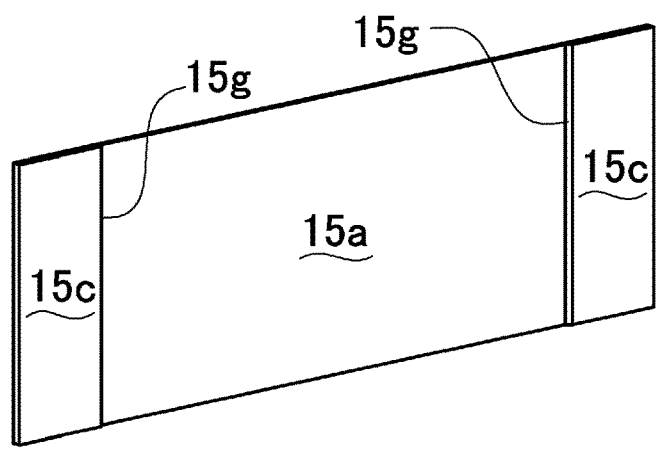
Figure 7C:
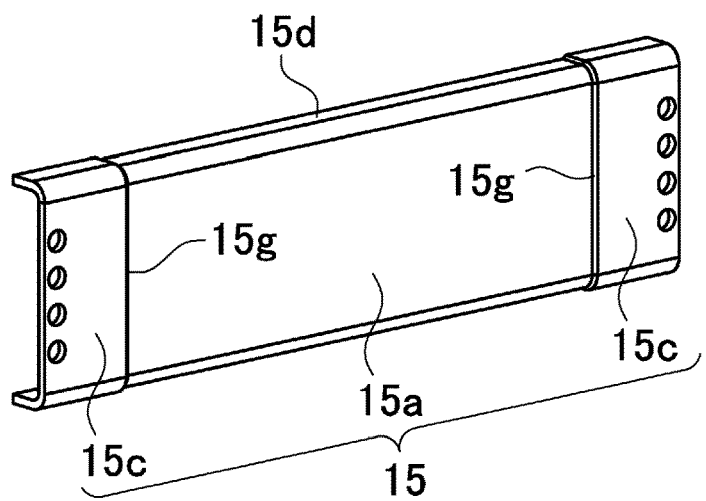

The joint interface between fastening part 15c and intermediate part 15a is welded by laser welding. As shown in FIG. 7A, as for the fastening member, metal plates (blanks) having a constant material thickness, i.e., fastening part 15c and intermediate part 15a in the state of the development view are welded in a state of being brought into contact with each other as shown in FIG. 7B, thereby obtaining fastening member 15 as shown in FIG. 7C. In these welding, particularly, as shown in FIG. 7B, it is preferable to weld the metal plates in a continuous linear manner. The configuration of welding in a continuous linear manner has a feature that the coupling strength of the plurality of metal plates can be enhanced. Specifically, the welding is performed along the joint interface between fastening part 15c and intermediate part 15a. As a result, as shown in the perspective view of FIG. 4, weld bead 15g is formed between fastening part 15c and intermediate part 15*a*. Such welding makes it possible to join metals to each other with higher reliability than that of spot welding or the like.

As fastening member 15, a metal plate such as iron, preferably a steel plate, iron, an iron alloy, SUS, aluminum, an aluminum alloy, or the like can be used.

Furthermore, as shown in FIG. 5, in fastening member 15, surfaces covering side surfaces of battery stack body 10 are preferably formed in the same plane in joint between fastening part 15*c* and intermediate part 15*a*. This makes it possible to cover the side surface of battery stack body 10 with a flat surface while constituting fastening member 15 with a plurality of members.

Furthermore, as shown in FIG. 7B, fastening member 15 is welded in the step of joining fastening part 15*c* and intermediate part 15*a*, and then press-molded into a predetermined shape in a pressing step. The upper and lower end edge parts of fastening member 15 shown in FIG. 7C are bent to form bent piece 15*d*. Upper and lower bent pieces 15*d* are shaped to cover upper and lower surfaces of battery stack body 10 from corners on both right and left side surfaces of battery stack body 10.

(Locking Block 15*b*)

FIG. 6 shows an exploded perspective view of fastening member 15. Fastening member 15 shown in this figure includes intermediate part 15*a*, fastening part 15*c*, and a block-shaped locking block 15*b*. Intermediate part 15*a* is a plate-like member, and fastening parts 15*c* are bonded to both ends of intermediate part 15*a* in the longer direction. Locking block 15*b* is fixed to an inner surface of an end edge part of fastening part 15*c*. Locking block 15*b* has a plate shape having a predetermined thickness, and is fixed in an attitude of projecting toward the inside of fastening part 15*c*. In a state where fastening member 15 is coupled to end plate 20, locking block 15*b* is locked to step part 20*b* provided on end plate 20 to dispose fastening member 15 at fixed positions on both sides of battery stack body 10. Locking block 15*b* is fixed to fastening part 15*c* by welding such as spot welding or laser welding.

Locking block 15*b* shown in the figure opens fastening-side through hole 15*bc* so as to coincide with end plate screw hole 20*c* in a state where end plate 20 is fastened. Fastening part 15*c* has fastening main surface-side through hole 15*ac* opened at a position corresponding to fastening-side through hole 15*bc*. Fastening-side through hole 15*bc* and fastening main surface-side through hole 15*ac* are designed to match in a state where locking block 15*b* is fixed to fastening part 15*c*.

A plurality of opened fastening-side through holes 15*bc* of locking block 15*b* are opened along the extending direction of locking block 15*b*. Similarly, a plurality of fastening main surface-side through holes 15*ac* are also opened along the end edge of fastening part 15*c* or the extending direction of locking block 15*b*. In accordance with this, a plurality of end plate screw holes 20*c* are formed along the side surface of end plate 20.

Locking block 15*b* is fixed to the outer peripheral surface of end plate 20 via a plurality of bolts 15*f*. Fixing of fastening member 15 with locking block 15*b* and end plate 20 is not necessarily limited to screwing using bolts, and may be with pins, rivets, or the like.

As described above, iron, an iron alloy, SUS, aluminum, an aluminum alloy, or the like can be used for intermediate part 15*a*, fastening part 15*c*, and locking block 15*b* that constitute fastening member 15. Locking block 15*b* can have a width of equal to or more than 10 mm in the battery stack direction. Furthermore, end plate 20 can be made of metal. Preferably, locking block 15*b* and fastening part 15*c* are made of the same metal. This makes it easy to weld locking block 15*b* and fastening part 15*c*.

As described above, not by bending fastening member 15 at the right and left end parts in the longer direction, i.e., at both end parts in the stacked layer direction of battery stack body 10 and screwing fastening member 15 from the main surface side of end plate 20, but by fastening battery stack body 10 by a locking structure and screwing by step part 20*b* of end plate 20 and locking block 15*b* without providing fastening member 15 with a bent part as a flat plate shape in the stack direction of battery stack body 10 as shown in FIGS. 1 to 3, it is possible to enhance strength and to mitigate the risk of breakage or the like due to expansion of secondary battery cells 1.

The power supply device in which the large number of secondary battery cells 1 are stacked is configured to bind a plurality of secondary battery cells 1 by coupling, by fastening members 15, end plates 20 disposed at both ends of battery stack body 10 including the plurality of secondary battery cells 1. By binding the plurality of secondary battery cells 1 via highly strong end plate 20 and fastening member 15, it is possible to suppress expansion, deformation, relative movement, malfunction due to vibration, and the like of secondary battery cells 1 due to charging and discharging and deterioration.

Figure 8:
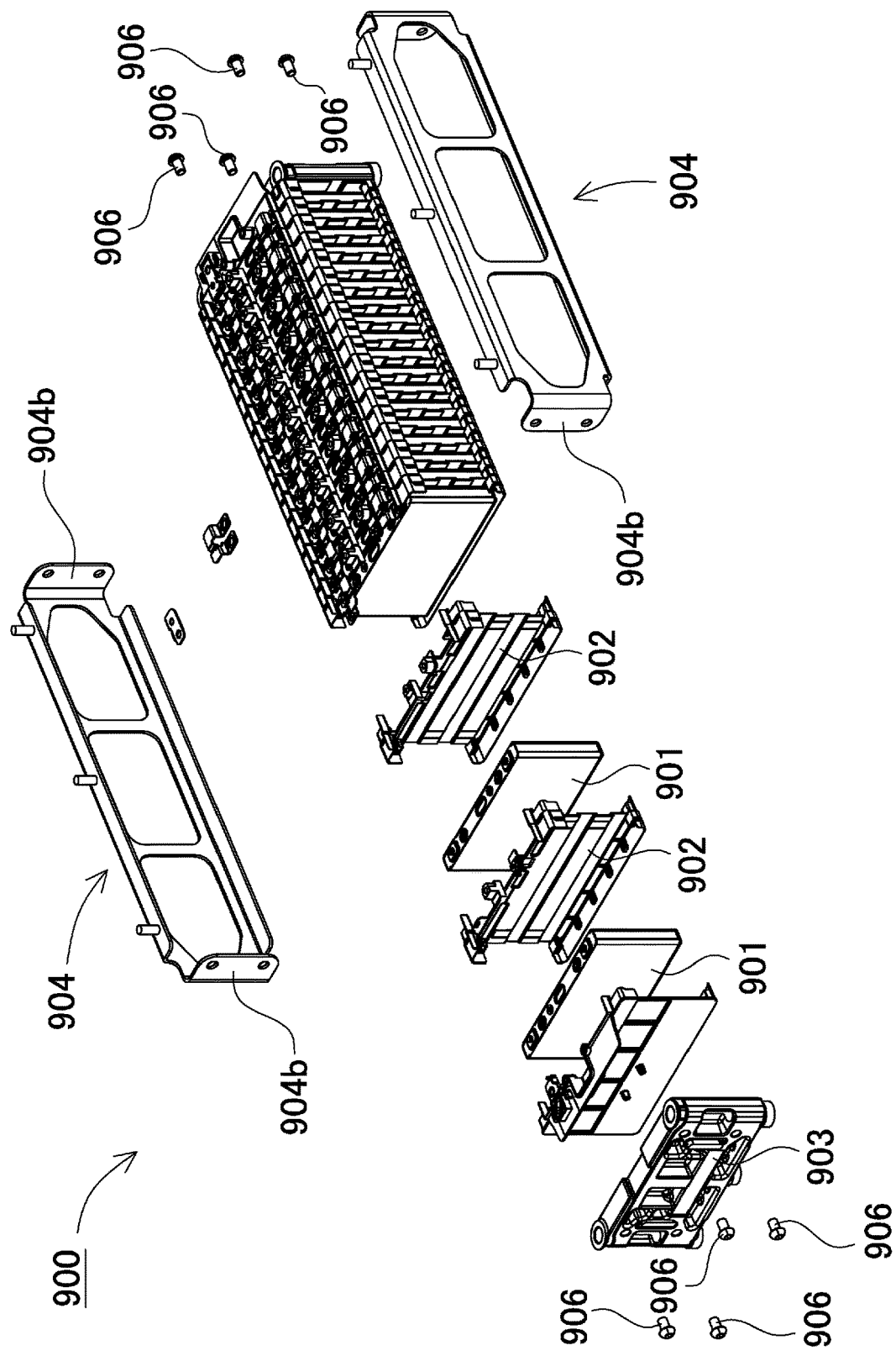
FIG. 8 is an exploded perspective view showing a conventional power supply device.

On the other hand, in a conventional power supply device in which both ends of the battery stack body are fixed by the end plate, an L-shaped portion in which an end part of the binding bar constituting the fastening member is bent inward is fixed to an outer surface of the end plate. For example, in power supply device 900 shown in the exploded perspective view of FIG. 8, a large number of prismatic secondary battery cells 901 are stacked with spacers 902 interposed therebetween, end plate 903 is disposed on an end surface, and binding bars 904 fasten them. Spacer 902 includes hard resin or the like. As shown in this figure, both end edges of binding bar 904 are bent into an L-shape, and L-shaped portion 904*b* is fixed to the main surface of end plate 903 with bolts 906.

In such a structure, the end part of binding bar 904 of metal plate is bent into an L-shape to form an L-shaped portion, and this L-shaped portion is fixed to the outer surface of end plate 903, and hence the L-shaped portion is a metal plate having the same thickness as that of binding bar 904. As binding bar 904, a metal plate having tensile strength that withstands a tensile force generated by the expansion force of secondary battery cells 901 is used. The tensile strength of the metal plate is considerably stronger than the bending strength, and for example, a metal plate of about 1 mm to 2 mm is used for binding bar 904. The bending stress acts on the L-shaped portion fixed to the outer surface of end plate 903 by the tensile force of binding bar 904, but the bending stress of the metal plate used for end plate 903 is considerably weaker than the tensile stress, and the bent part of the L-shaped portion is deformed and broken beyond the proof stress and the breaking strength by the bending stress acting on the L-shaped portion. Unless there is a gap between the bent part of the L-shaped portion and end plate 903, the inner surface of the bent part comes into contact with the corner part of end plate 903, and assembly cannot be performed.

Thus, an increase in the tensile force applied to the binding bar causes further locally strong stress to concentrate on the inside of the bent part of the binding bar and the end plate corner part, and to deform and damage the binding bar and the end plate. Therefore, the present applicant has developed power supply device 800 shown in FIG. 9. Power supply device 800 includes battery stack body 810 in which a plurality of secondary battery cells 801 are stacked, a pair of end plates 820 disposed at both end parts in a stack direction of battery stack body 810, and fastening member 815 coupling the both end parts to the pair of end plates 820. Fastening member 815 includes fastening main surface 815*a* extending in the stack direction of battery stack body 810, and locking block 815*b* provided on fastening main surface 815*a* and protruding toward the surface facing the outer peripheral surface of end plate 820. Locking block 815*b* is fixed to the inner peripheral surface of fixing hole 815*g* in a state of being inserted into fixing hole 815*g* provided on fastening main surface 815*a*. End plate 820 has, on the outer peripheral surface, fitting portion 820*c* to which locking block 815*b* is guided, and a protruding step part is provided as stopper portion 820*b* to be engaged with locking block 815*b* close to battery stack body 810 of fitting portion 820*c*. In power supply device 800, locking block 815*b* is guided to fitting portion 820*c*, and locking block 815*b* is fixed to the outer peripheral surface of end plate 820.

In the power supply device of this structure, the locking block is guided to the fitting portion, the stopper portion blocks positional displacement, and the locking block is fixed to the end plate. Therefore, the fastening member can be fixed to the end plate by the locking block and the stopper portion without deforming, unlike the L-shaped portion of the conventional fastening member that deforms by the bending stress. In particular, since the locking block is guided to the fitting portion of the end plate to block the positional displacement by the stopper portion, the deformation of the fastening member and the end plate due to the strong tensile force acting on the fastening member can be prevented, and the movement of the end plate can be suppressed.

Figure 10:
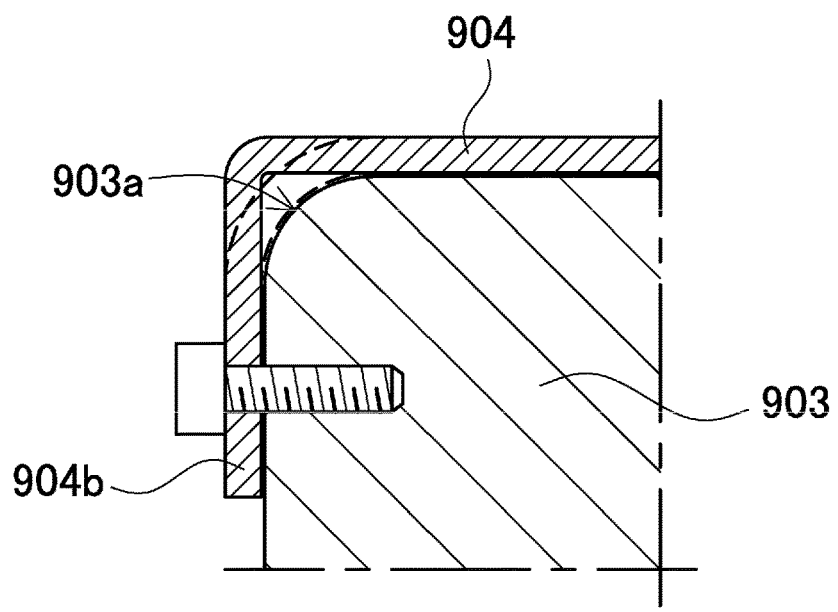
FIG. 10 is an enlarged cross-sectional view showing a bent part of a fastening member of the conventional power supply device.

In the fastening member, a strong tensile force acts as a reaction of the expansion force of the secondary battery cell. In conventional power supply device 900, the tensile force of binding bar 904 constituting the fastening member acts as a bending stress at the bent part and deforms. When binding bar 904 deforms by the bending stress, in FIG. 10, the inner surface of L-shaped portion 904*b*, which is a bent part, is brought into close contact with corner part 903*a* of end plate 903, and binding bar 904 is substantially extended. In this state, there is a possibility of break beyond the proof stress and strength of the material.

Figure 9:
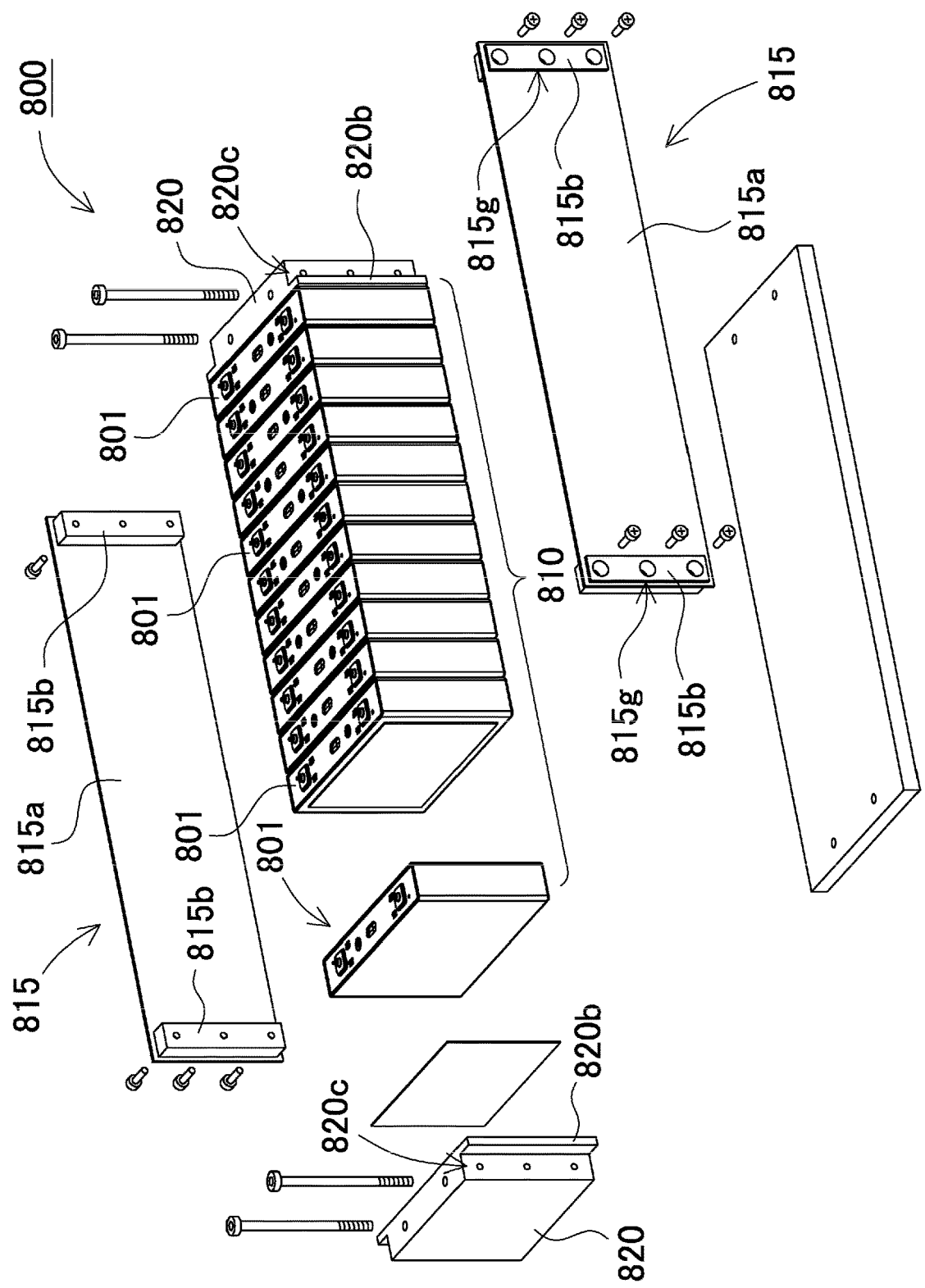
FIG. 9 is an exploded perspective view showing a power supply device previously developed by the present applicant.

On the other hand, in the power supply device of the structure of FIG. 9, locking block 815*b* provided on fastening member 815 is guided to fitting portion 820*c* of end plate 820, and stopper portion 820*b* blocks the positional displacement of locking block 815*b* guided here. Even if there is a gap between locking block 815*b* and end plate 820, fastening member 815 fixed to end plate 820 with this structure does not support locking block 815*b* as the bending stress of the L-shaped portion as in the conventional case, but supports locking block 815*b* as the shear stress of the fastening member 815 by the structure in which locking block 815*b* is guided to fitting portion 820*c* and disposed at a fixed position by stopper portion 820*b*. The strength of fastening member 815 to the shear stress is considerably stronger than the tensile force, and the movement of end plate 820 is suppressed without being deformed by the strong tensile force acting on fastening member 815.

On the other hand, in the fastening member including the fastening main surface and the locking block, it is necessary to fix the fastening main surface and the locking block. In general, the fastening main surface and the locking block that include a metal member are often welded and fixed by spot welding of laser light. In this case, a certain level of thickness is required to perform spot welding on the metal member. Here, when the metal plate of the fastening main surface is thickened, the strength is enhanced, and as a result, the stretchability deteriorates. The fastening member is required to be able to follow the deformation of the secondary battery cell at the time of expansion, but the metal plate generally has low elasticity, and the thicker the metal plate becomes, the higher the strength becomes and the less easily the metal plate deforms. However, if the fastening main surface is formed thin, the strength of spot welding with the locking block is reduced this time, and the reliability of the fastening strength deteriorates. Thus, since the requirements for strength and stretchability required for the fastening member are contradictory, it has been difficult to achieve the both requirements.

Therefore, in the present exemplary embodiment, fastening member 15 includes partially different members, thereby successfully achieving both strength and stretchability. Specifically, as described above, fastening member 15 is divided into fastening part 15*c* and intermediate part 15*a*. Fastening part 15*c* is formed to be t2, thicker than thickness t1 of intermediate part 15*a*. As a result, a thickness sufficient for spot welding can be secured in fastening part 15*c*, and the joint strength with locking block 15*b* can be exhibited. On the other hand, intermediate part 15*a* has reduced thickness t1, and intermediate part 15*a* is deformed at the time of expansion of secondary battery cell 1 to ensure followability.

Figure 11:
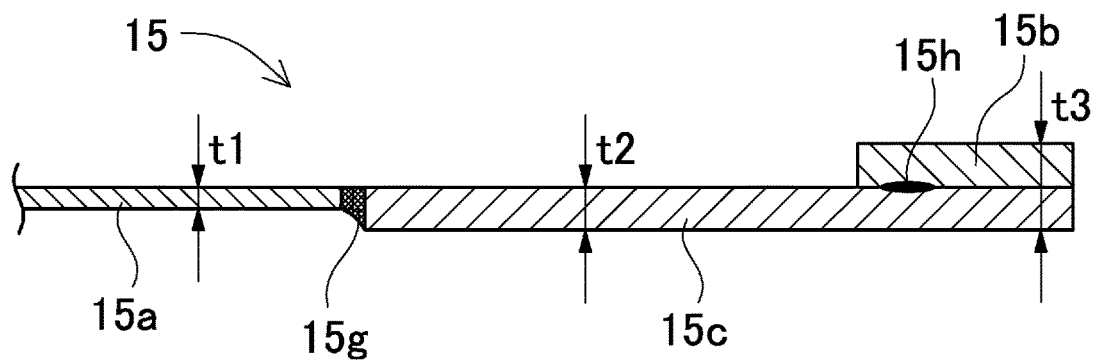
FIG. 11 is a horizontally enlarged end surface view taken along line XI-XI of FIG. 4.

As for the thickness of fastening member 15, as shown in the horizontal end surface view of FIG. 11, thickness t2 of fastening part 15*c* increases toward the outside of fastening member 15 with respect to thickness t1 of intermediate part 15*a*. On the inside of fastening member 15, i.e., on a side facing battery stack body 10, the interface between fastening part 15*c* and intermediate part 15*a* is made the same plane. On the other hand, in the portion of fastening member 15 with thickness t3 to which locking block 15*b* is fixed, inversely, locking block 15*b* protrudes inward while the outside of fastening member 15 is the same plane. Accordingly, locking block 15*b* is locked to step part 20*b* of end plate 20 to enhance resistance against shear stress, and fastening part 15*c* does not affect close to battery stack body 10. Even if fastening part 15*c* becomes thick.

The position where locking block 15*b* is spot-welded to fastening member 15, i.e., fixing region 15*h* where locking block 15*b* is fixed to fastening member 15, is between fastening-side through holes 15*bc*. Furthermore, fixing region 15*h* may be offset inward in the stack direction of secondary battery cells 1, i.e., in a direction approaching intermediate part 15*a*. Thus, by disposing fixing region 15*h* in a direction away from end plate 20 with respect to fastening-side through hole 15*bc*, it is possible to mitigate concentration of stress by increasing the distance between fastening-side through hole 15*bc* opened in locking block 15*b* and fixing region 15*h*. Furthermore, by positioning fixing region 15*h* not on first straight line L1 connecting the centers of the fastening main surface-side through holes 15*ac*, which are screw holes, but on second straight line L2 shifted from first straight line L1, it is possible to secure a large area for spot welding. Since fastening main surface-side through hole 15*ac* is circular, a large area is easily secured by offsetting fastening main surface-side through hole 15*ac*, and as a result of being able to increase the area for spot welding, the joint strength of welding is also enhanced.

The direction in which fixing region 15h is offset from first straight line L1 is preferably a direction away from both end edges of fastening member 15 and a direction approaching step part 20b provided on end plate 20. In the example of the exploded perspective view shown in FIG. 6, a plurality of fixing regions 15h are offset to the center direction of battery stack body 10. This allows the stress at the time of expansion of secondary battery cell 1 to be received in each fixing region 15h, thereby contributing to dispersion of the applied stress and helping to improve the strength of fastening member 15.

As described above, according to power supply device 100 according to the present exemplary embodiment, the stress to be expanded in the battery stack direction generated by expansion of secondary battery cells 1 is applied not only to fastening part 15c itself but also to each member of the engagement by step part 20b and locking block 15b, welding by fastening part 15c and locking block 15b, and screwing by bolt 15f. Therefore, by enhancing the strength of these members and appropriately dispersing the stress, it is possible to enhance the strength as a whole and achieve power supply device 100 that can cope with expansion and contraction of secondary battery cell 1.

Second Exemplary Embodiment

Figure 12:
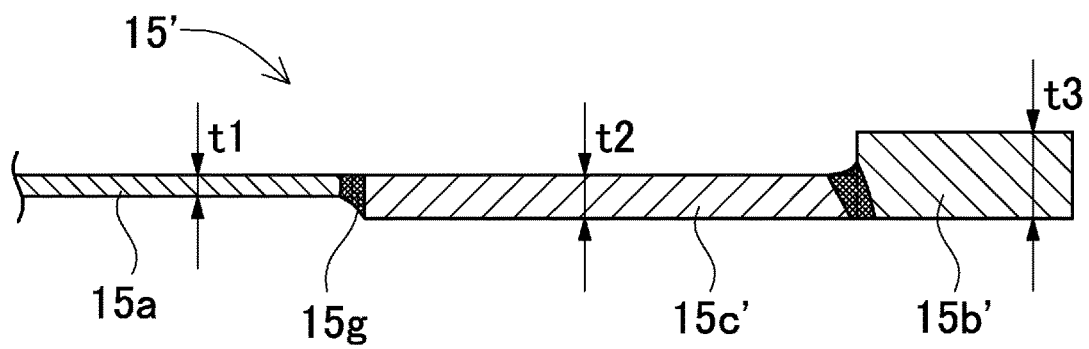
FIG. 12 is a horizontally enlarged end surface view of a fastening member according to a second exemplary embodiment.

In the above example, an example in which the locking block is joined by spot welding has been described. However, the present invention is not limited to this configuration, and the fastening member having the locking block may be formed of a differential thickness material. Such an example is shown in the horizontal end surface view of FIG. 12 as a second exemplary embodiment. In fastening member 15' shown in this figure, intermediate part 15a and one end surface of fastening part 15c' are joined, and locking block 15b' is further joined to the other end surface of fastening part 15c'. Locking block 15b' is formed to have thickness t3 in advance. In addition, fastening part 15c' is formed to be narrower in width than that in the example of FIG. 11 by the width of locking block 15b'. According to this method, since it is possible to simultaneously join, by welding, intermediate part 15a, fastening part 15c', and locking block 15b', it is possible to achieve an advantage that the manufacturing process can be simplified.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the electric vehicle, an example will be described in which a large number of the above-described power supply devices are connected in series or in parallel, and large-capacity, high-output power supply device 100 to which a necessary control circuit is further added is constructed.

(Power Supply Device for Hybrid Vehicle)

Figure 13:
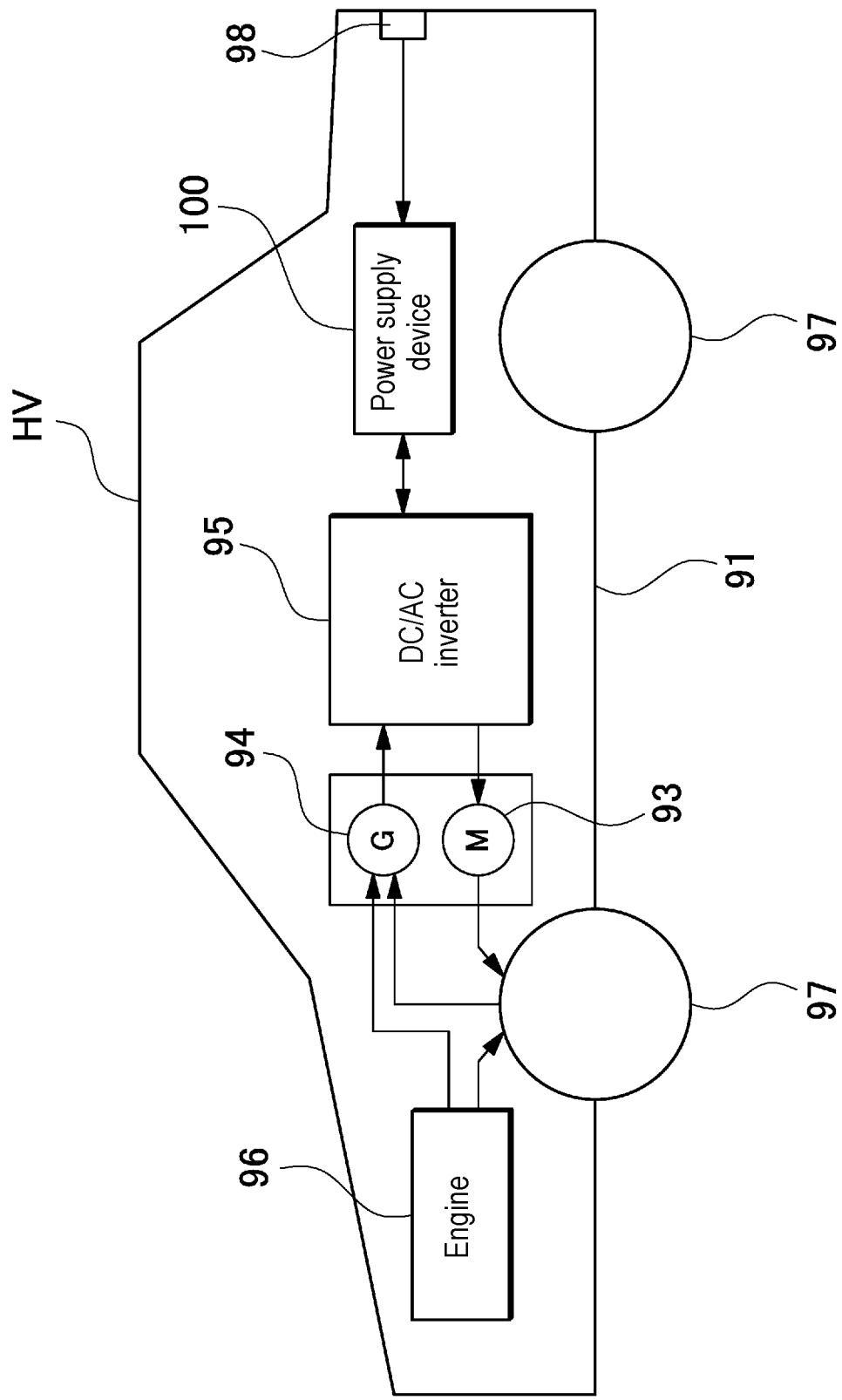
FIG. 13 is a block diagram showing an example in which the power supply device is mounted on a hybrid vehicle traveling by an engine and a motor.

FIG. 13 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by power supplied from power supply device 100. Generator 94 is driven by engine 96 or by regenerative braking when braking the vehicle to charge the battery of power supply device 100. As shown in FIG. 13, vehicle HV may include charging plug 98 for charging power supply device 100. Power supply device 100 can be charged by connecting charging plug 98 to an external power supply.

(Power Supply Device for Electric Vehicle)

Figure 14:
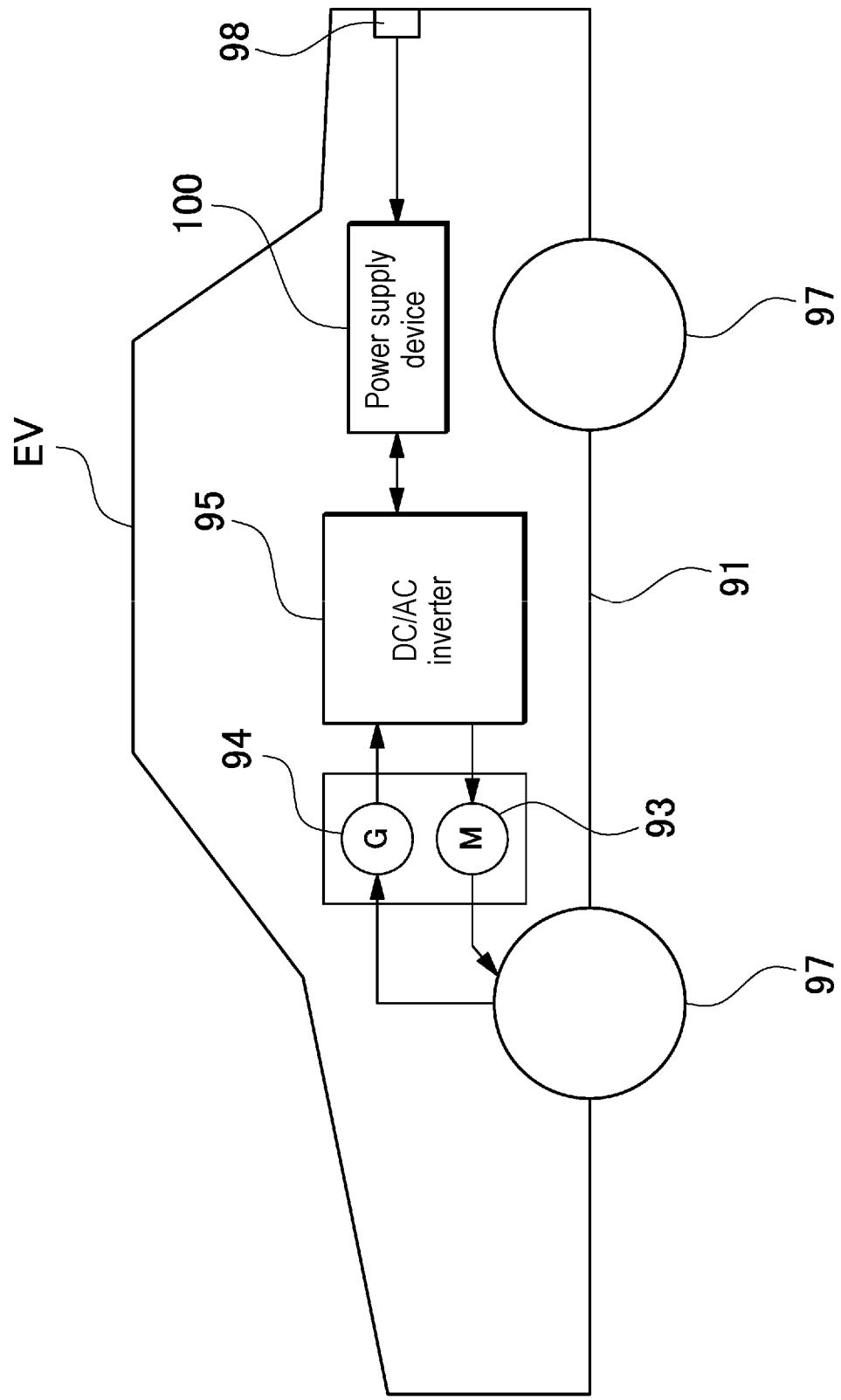
FIG. 14 is a block diagram showing an example in which the power supply device is mounted on an electric vehicle traveling only by a motor.

FIG. 14 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. Power supply device 100 is connected to motor 93 and generator 94 via DC/AC inverter 95. Motor 93 is driven by power supplied from power supply device 100. Generator 94 is driven by the energy at the time of regenerative braking of vehicle EV to charge the battery of power supply device 100. In addition, vehicle EV includes charging plug 98, and power supply device 100 can be charged by connecting charging plug 98 to an external power supply.

(Power Supply Device for Power Storage Device)

Figure 15:
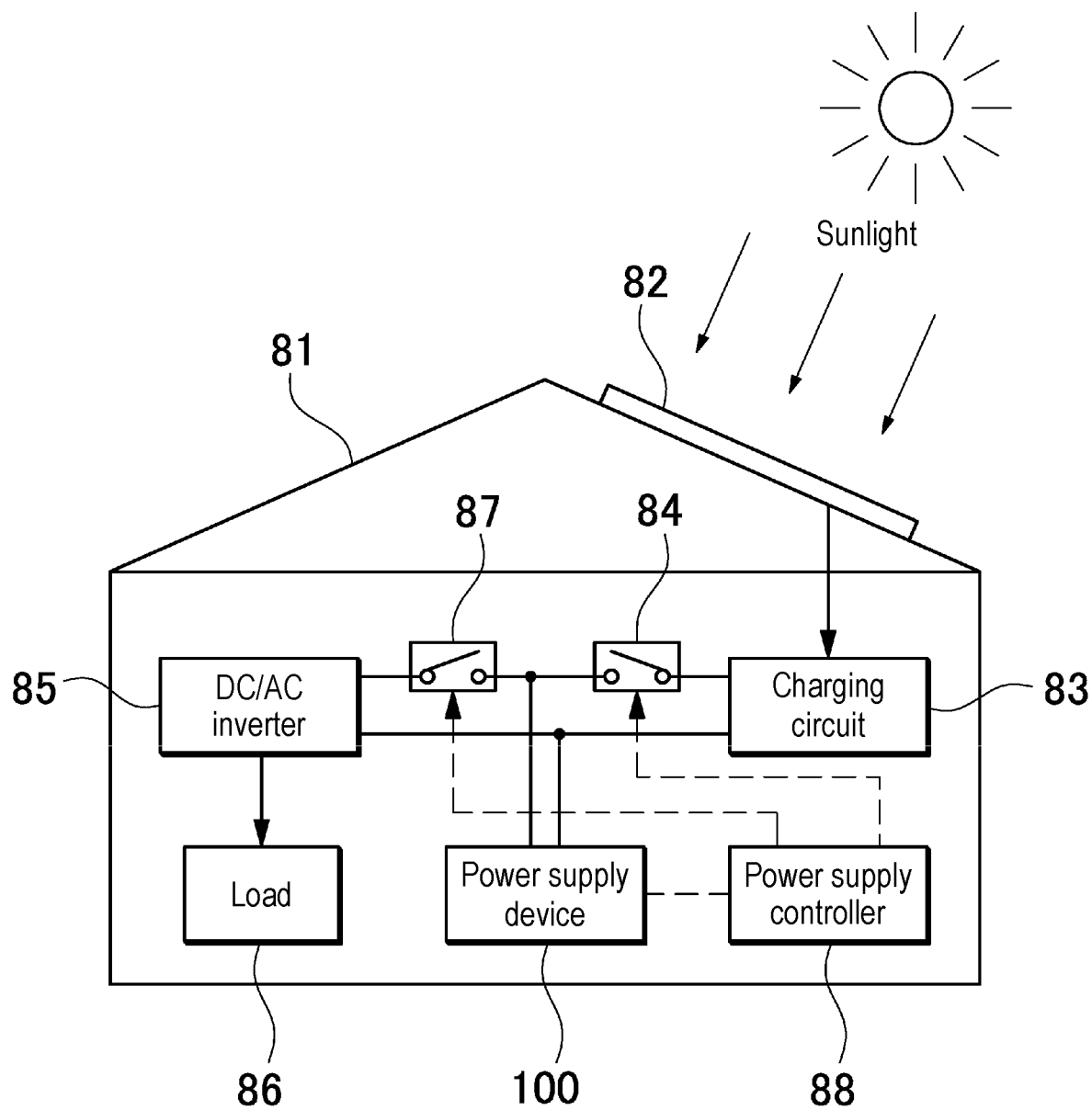
FIG. 15 is a block diagram showing an example of application to a power supply device for power storage.

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like. FIG. 15 shows a power storage device that stores electricity by charging the battery of power supply device 100 with solar cell 82.

The power storage device shown in FIG. 15 charges the battery of power supply device 100 with electric power generated by solar cell 82 disposed on a roof, a rooftop, or the like of building 81 such as a house or a factory. This power storage device charges the battery of power supply device 100 by charging circuit 83 using solar cell 82 as a charging power source, and then supplies electric power to load 86 via DC/AC inverter 85. Therefore, this power storage device includes a charging mode and a discharging mode. In the power storage device shown in the figure, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In the charging mode, power supply controller 88 switches charging switch 84 to on and switches discharging switch 87 to off to permit charging from charging circuit 83 to power supply device 100. When the charging is completed and the battery is fully charged, or in a state where a capacity equal to or greater than a predetermined value is charged, power supply controller 88 turns off charging switch 84 and turns on discharging switch 87 to switch to the discharging mode, and permits discharge from power supply device 100 to load 86. Furthermore, it is also possible to simultaneously perform electric power supply to load 86 and charging of power supply device 100 by turning on charging switch 84 and turning on discharging switch 87 as necessary.

Furthermore, although not illustrated, the power supply device can also be used as a power supply for a power storage device that charges and stores a battery using midnight electric power at night. The power supply device charged with the midnight power can be charged with the midnight electric power, which is surplus power of the power plant, outputs power in the daytime when the power load becomes large, and limit the peak power in the daytime to be small. Furthermore, the power supply device can also be used as a power supply that charges with both the output of a solar cell and the midnight electric power. This power supply device can efficiently store electricity in consideration of weather and power consumption by effectively using both power generated by the solar cell and midnight electric power.

The power storage device as described above can be suitably used for applications such as a backup power supply device that can be mounted on a rack of a computer server, a backup power supply device for a wireless base station such as a mobile phone, a power supply for household or factory power storage, a power supply device combined with a solar cell such as a power supply for street lamps, and a backup power supply for traffic lights and traffic indicators for roads.

INDUSTRIAL APPLICABILITY

The power supply device and the electric vehicle and the power storage device using the same, the fastening member for the power supply device, the manufacturing method for the power supply device, and the manufacturing method for the fastening member for the power supply device according to the present invention can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. The present invention can be appropriately used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and the like.

REFERENCE MARKS IN THE DRAWINGS

100: power supply device
1: secondary battery cell
1X: terminal surface
1a: exterior can
1b: sealing plate
2: electrode terminal
10: battery stack body
15, 15': fastening member
15a: intermediate part
15b, 15b': locking block
15c, 15c': fastening part
15ac: fastening main surface-side through hole
15bc: fastening-side through hole
15d: bent piece
15f: bolt
15g: weld bead
15h: fixing region
16: insulating spacer
17: end surface spacer
20: end plate
20b: step part
20c: end plate screw hole
81: building
82: solar cell
83: charging circuit
84: charging switch
85: DC/AC inverter
86: load
87: discharging switch
88: power supply controller
91: vehicle body
93: motor
94: generator
95: DC/AC inverter
96: engine
97: wheel
98: charging plug
800: power supply device
801: secondary battery cell
810: battery stack body
815: fastening member
815a: fastening main surface
815b: locking block
815g: fixing hole
820: end plate
820b: stopper portion
820c: fitting portion
900: power supply device
901: secondary battery cell
902: spacer
903: end plate
903a: corner part
904: binding bar
904b: L-shaped portion
906: bolt
L1: first straight line
L2: second straight line
HV, EV: vehicle

The invention claimed is:
1. A power supply device comprising:
a plurality of secondary battery cells each including a prismatic exterior can;
a pair of end plates covering both end surfaces of a battery stack body including the plurality of secondary battery cells are stacked; and
a plurality of fastening members made of metal, each of the plurality of fastening members including in a plate shape extending in a stack direction of the plurality of secondary battery cells, the plurality of fastening members being disposed on side surfaces of the battery stack body, the side surfaces opposing each other, each of the plurality of fastening members fastening the end plates to each other,
wherein each of the plurality of fastening members includes
fastening parts each fixed to a corresponding one of the end plates at both ends in a longer direction, a locking block fixed to each of the fastening parts, the locking block facing a side surface of the battery stack body and defining fastening-side through hole to fasten to the end plate, and
an intermediate part coupling a plurality of the fastening parts with each other,
wherein each of the fastening parts is higher in strength than the intermediate part,
wherein each of the fastening parts is thicker than the intermediate part and thinner than the locking block, and
wherein the intermediate part is higher in stretchability than each of the fastening parts.

2. The power supply device according to claim 1, wherein
the each of end plates includes a step part for locking the locking block in a state of being fastened by the fastening members, and
the fastening part and the locking block are fixed by welding.

3. The power supply device according to claim 1, wherein
the fastening part includes a first metal,
the intermediate part includes a second metal different from the first metal,
the first metal is higher in strength than the second metal, and
the second metal is higher in stretchability than the first metal.

4. The power supply device according to claim 1, wherein surfaces covering side surfaces of the battery stack body of each of the plurality of fastening members are disposed in a same plane in joint between the fastening part and the intermediate part.

5. The power supply device according to claim 1, wherein each of the fastening members includes a differential thickness material.

6. The power supply device according to claim 1, wherein a joint interface between the fastening part and an intermediate part of each of the fastening members is joined by welding.

7. An electric vehicle including the power supply device according to claim 1, the electric vehicle comprising:
the power supply device;
a motor for traveling supplied electric power from the power source device;
a vehicle body mounting the power supply device and the motor; and
a wheel driven by the motor to cause the vehicle body to travel.

8. A power storage device including the power supply device according to claim 1, the power storage device comprising:
the power supply device; and
a power supply controller that controls charging and discharging of the power supply device, wherein the power supply controller enables charging of the plurality of secondary battery cells by external electric power and causes the plurality of secondary battery cells to be charged.

* * * * *